(12) United States Patent
Oohori et al.

(10) Patent No.: US 7,412,907 B2
(45) Date of Patent: Aug. 19, 2008

(54) RANGE RECOGNITION APPARATUS FOR AUTOMATIC TRANSMISSION

(75) Inventors: Takeshi Oohori, Kanagawa (JP); Youhei Ishikawa, Kanagawa (JP); Takuichiro Inoue, Kanagawa (JP); Hiroyasu Tanaka, Kanagawa (JP)

(73) Assignee: Jatco Ltd, Shizuoka (JP)

( * ) Notice: Subject to any disclaimer, the term of this patent is extended or adjusted under 35 U.S.C. 154(b) by 179 days.

(21) Appl. No.: 11/243,181

(22) Filed: Oct. 5, 2005

(65) Prior Publication Data

US 2006/0075839 A1    Apr. 13, 2006

(30) Foreign Application Priority Data

Oct. 7, 2004    (JP)    ............................ 2004-295000

(51) Int. Cl.
  *F16H 59/00*    (2006.01)
  *F16H 61/00*    (2006.01)
  *F16H 63/00*    (2006.01)
  *B60Q 1/00*    (2006.01)

(52) U.S. Cl. ........................................ 74/335; 340/456

(58) Field of Classification Search ................... 74/335; 477/97; 340/456; 701/51, 63
See application file for complete search history.

(56) References Cited

U.S. PATENT DOCUMENTS 5,337,624 A * 8/1994 Bulgrien et al. ............... 74/335
5,660,079 A * 8/1997 Friedrich ................ 74/471 XY
6,076,414 A * 6/2000 Tabata et al. ................... 74/335
6,205,874 B1 * 3/2001 Kupper et al. .................. 74/335
6,376,929 B1 * 4/2002 Nakajima .................. 307/10.1
6,984,191 B2 * 1/2006 Kuwata et al. ................. 477/97
2002/0189381 A1 * 12/2002 Kliemannel et al. ........... 74/335
2004/0079181 A1 * 4/2004 von Haeften ................. 74/335

FOREIGN PATENT DOCUMENTS

| JP | 8-277913 A | 10/1996 |
| JP | 10-329568 A | 12/1998 |
| JP | 11-099840 A | 4/1999 |
| JP | 2001-304395 A | 10/2001 |
| JP | 2003-294134 A | 10/2003 |

* cited by examiner

*Primary Examiner*—Tisha D Lewis
(74) *Attorney, Agent, or Firm*—Foley & Lardner LLP

(57) ABSTRACT

A range recognition apparatus for an automatic transmission. A first contact is configured to generate a first range signal during a state of a range selector being within a first region. A second contact is configured to generate a second range signal during the state of the range selector being within a second region overlapping with the first region. A controller is configured to recognize that a first gear range of the automatic transmission is selected, when the first range signal is present and the second range signal is absent; to recognize that a second gear range of the automatic transmission is selected, when the first range signal is absent and the second range signal is present; and to recognize that the first gear range is selected, when the first range signal and the second range signal are both present.

15 Claims, 5 Drawing Sheets

RANGE RECOGNITION APPARATUS FOR AUTOMATIC TRANSMISSION

BACKGROUND OF THE INVENTION

The present invention relates generally to automatic transmissions, and more particularly to apparatus for recognizing a selected gear range of an automatic transmission.

A typical automatic transmission includes a shift gate on which a plurality of gear ranges are indicated with letters, such as P, N, R, D, S, and L, and a select lever operable or movable in a groove of the shift gate for selecting the gear ranges, such as a P range for parking, an N range for stop etc., a D range for normal driving, and an L range for engine braking etc. A Published Japanese Patent Application No. H10(1998)-329568 (hereinafter referred to as "JP10-329568") shows a device for recognizing each selected gear range of an automatic transmission in accordance with a range signal from an inhibitor switch for outputting a single signal for each gear range. On the other hand, a Published Japanese Patent Application No. 2003-294134 (hereinafter referred to as "JP2003-294134") shows a device for an automatic transmission which includes an inhibitor switch including a plurality of contacts for each gear range, and a controller configured to recognize each selected gear range in accordance with a combination of the range signals of the plurality of contacts.

SUMMARY OF THE INVENTION

When no range signal is input to a typical controller of an automatic transmission, the controller handles this condition as an unfixed signal (an abnormality), and performs a selection control operation as a fail-safe function, releasing the lock-up of a torque converter of the automatic transmission.

However, the inhibitor switch shown in JP10-329568 outputs an intermittent range signal, since the contacts of the inhibitor switch are individually connected over a plurality of gear ranges in accordance with select lever operation. Accordingly, it is possible that during the select lever being in an intermediate position between the D range and the L range (hereinafter referred to as "D-L middle range"), no range signal is input to the controller, so that the lock-up of the torque converter is released although the lock-up is desired to be held.

Even with a method of measuring a period of time of the non-signal input state, and handling it as an unfixed signal in case the time period excesses a predetermined period of time, there is still a possibility that undesired release of the lock-up happens.

On the other hand, the inhibitor switch shown in JP2003-294134 has a relatively complicated structure, and a relatively complicated processing of range recognition. The device may be expensive accordingly.

Accordingly, it is an object of the present invention to simply and certainly recognize a selected gear range of an automatic transmission, particularly during a select lever is in a transient position between two adjacent gear ranges.

According to one aspect of the present invention, a range recognition apparatus for an automatic transmission, comprises: a range selector; a first contact configured to generate a first range signal during a state of the range selector being within a first region; a second contact configured to generate a second range signal during the state of the range selector being within a second region overlapping with the first region; and a controller connected for signal communication to the first contact and to the second contact, and configured to perform the following: recognizing that a first gear range of the automatic transmission is selected, when the first range signal is present and the second range signal is absent; recognizing that a second gear range of the automatic transmission is selected, when the first range signal is absent and the second range signal is present; and recognizing that the first gear range is selected, when the first range signal and the second range signal are both present.

According to another aspect of the invention, a range recognition apparatus for an automatic transmission, comprises: range selection means for allowing a range selection operation; first contact means for generating a first range signal during a state of the range selection means being within a first region; second contact means for generating a second range signal during the state of the range selection means being within a second region overlapping with the first region; and control means for performing the following: recognizing that a first gear range of the automatic transmission is selected, when the first range signal is present and the second range signal is absent; recognizing that a second gear range of the automatic transmission is selected, when the first range signal is absent and the second range signal is present; and recognizing that the first gear range is selected, when the first range signal and the second range signal are both present.

DETAILED DESCRIPTION OF THE INVENTION

Figure 1:
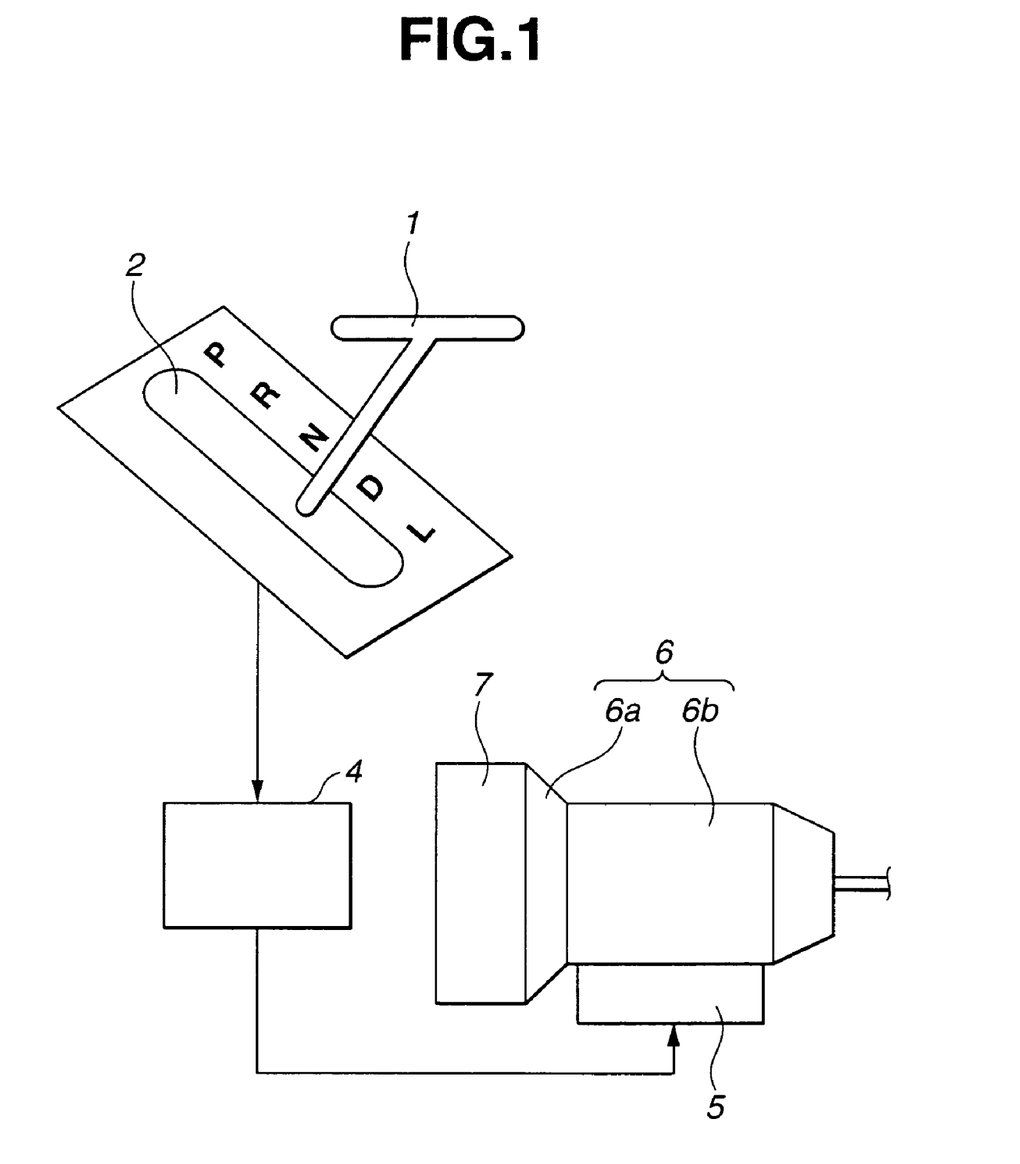
FIG. 1 is a schematic system diagram showing an automotive automatic transmission with a range recognition apparatus in accordance with an embodiment of the present invention.
Figure 2:
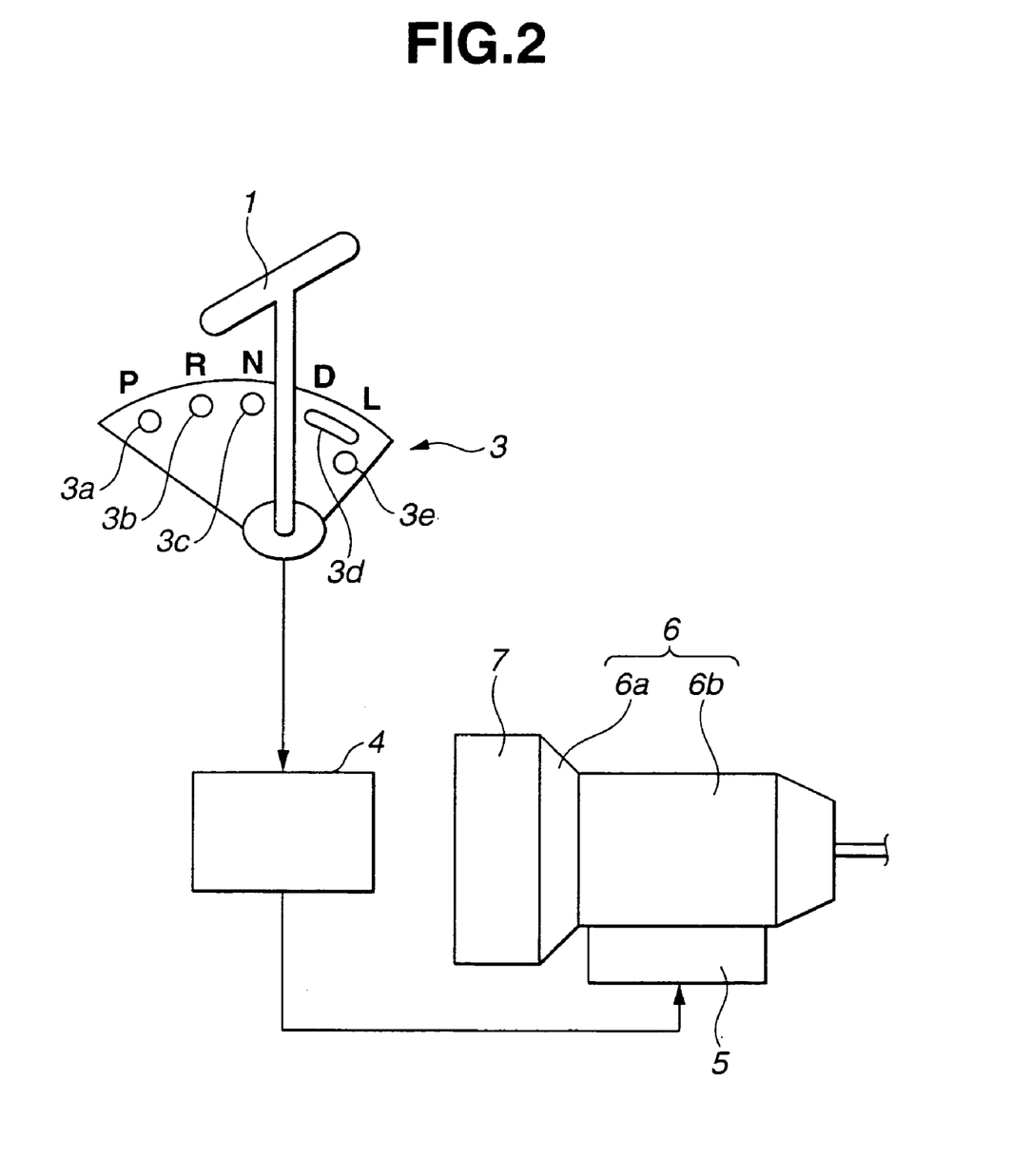
FIG. 2 is a schematic system diagram showing a detailed construction of an inhibitor switch in the automatic transmission system of FIG. 1.

FIG. 1 is a schematic system diagram showing an automotive automatic transmission with a range recognition apparatus in accordance with an embodiment of the present invention. FIG. 2 is a schematic system diagram showing a detailed construction of an inhibitor switch in the automatic transmission system of FIG. 1. As shown in FIGS. 1 and 2, the automatic transmission system includes a range selector such as a select lever (selector lever) 1, a shift gate 2, an inhibitor switch (selector position switch) 3, a controller 4, a control valve unit 5, and an automatic transmission 6. Select lever 1 is manually operated or moved by a driver. Shift gate 2 supports or guides select lever 1, and positions select lever 1 in each position corresponding to indicators P, R, N, D, and L marked along a side portion of a groove of shift gate 2.

As shown in FIG. 2, inhibitor switch 3 is coupled to select lever 1. Inhibitor switch 3 has five contacts or terminals 3a, 3b, 3c, 3d, and 3e. Contacts 3a, 3b, 3c, 3d, and 3e are individually connected to a circuit by operation of select lever 1, and each configured to generate or output a single signal as a range signal. Specifically, when select lever 1 is connected to contact 3a, contact 3a outputs a P range signal P indicative of a P (parking) range for parking. When select lever 1 is connected to contact 3b, contact 3b outputs an R range signal indicative of an R (reverse) range for a reverse speed. When select lever 1 is connected to contact 3c, contact 3c outputs an N range signal indicative N of an N (neutral) range for a stop etc. When select lever 1 is connected to contact 3d, contact 3d outputs a D range signal D indicative of a D (drive) range for usual or normal driving by selecting a suitable gear ratio in accordance with vehicle operation etc. When select lever 1 is connected to contact 3e, contact 3e outputs an L range signal L indicative of an L (low) range for a low-speed driving including engine-braking driving by selecting predetermined low gear ratios, such as the first speed and the second speed.

Controller 4 is an integrated circuit (IC) with a high computing power, such as a microcomputer. Controller 4 is configured to recognize a gear range selected or desired or requested by a driver in accordance with the range signal S input from inhibitor switch 3. Controller 4 is also configured to control a shift operation of automatic transmission 6 in accordance with the recognized range selection.

Automatic transmission 6 includes a lock-up torque converter 6a to receive the output from an engine 7, and a transmission mechanism 6b to transmit the output of torque converter 6a. Transmission mechanism 6b is of a step type including frictional elements, such as a clutch and a brake, and configured to engage and disengage the frictional elements by controlling solenoid valves accommodated in control valve unit 5 by duty control. Lockup torque converter 6a is automatically locked up in high rear ratios of D range and L range to eliminate internal slippage and improve fuel economy.

Figure 6:
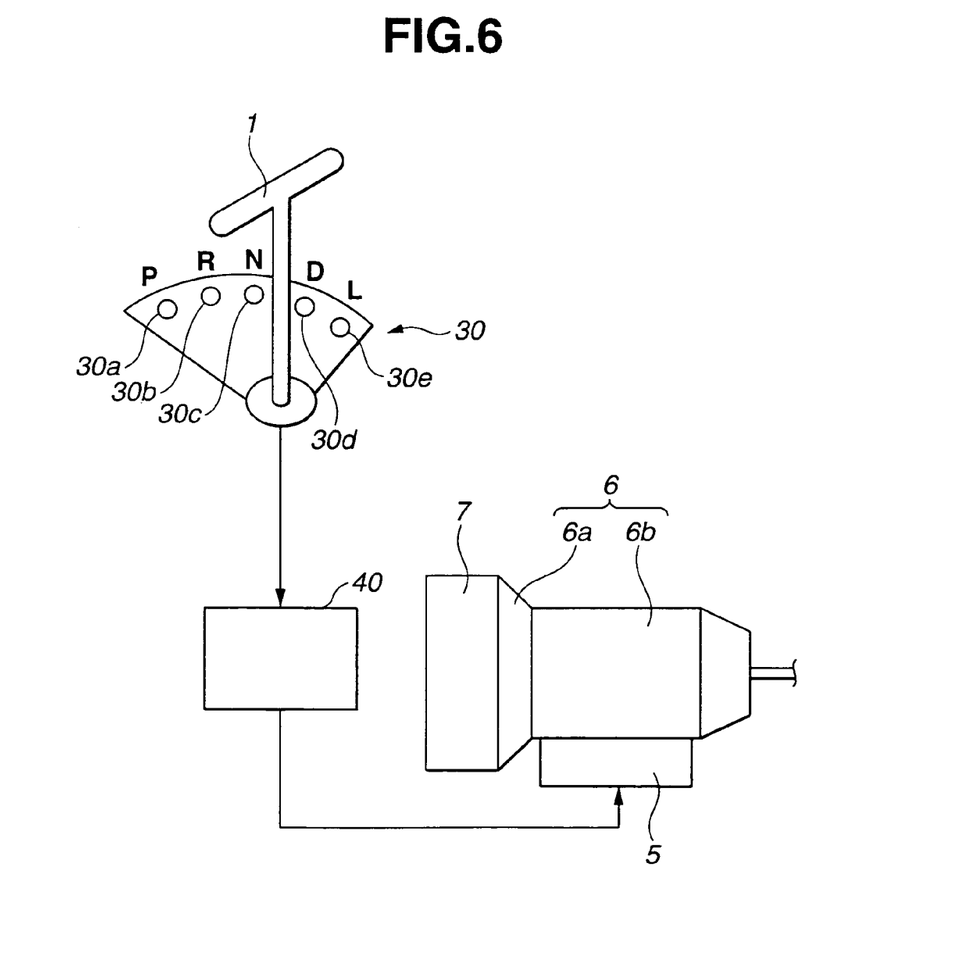
FIG. 6 is a schematic system diagram showing an automatic transmission with a range recognition device in accordance with a reference embodiment.

FIG. 6 is a schematic system diagram showing an automatic transmission with a range recognition device in accordance with a reference embodiment. As shown in FIG. 6, reference inhibitor switch 30 includes contacts 30a through 30e. Contacts 30a, 30b, 30c, 30d, and 30e are individually connected to a circuit by operation of select lever 1, and each configured to output a single signal as a range signal.

Figure 3A:
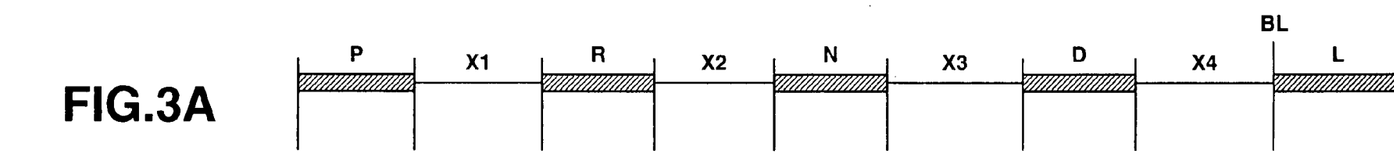
FIG. 3A is a view showing how a range signal is input from an inhibitor switch into a controller with respect to a position of a select lever in a reference range recognition device.
Figure 3B:
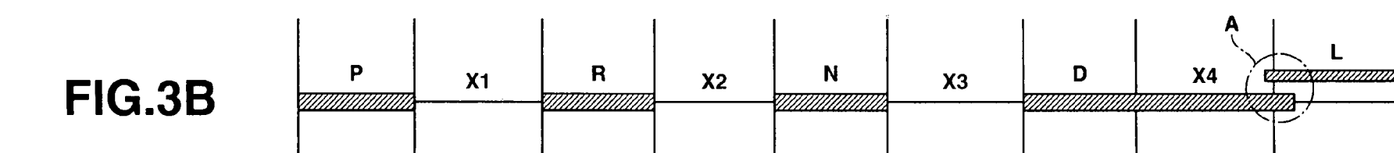
FIG. 3B is a view showing how a range signal is input from an inhibitor switch into a controller with respect to a position of a select lever in the range recognition apparatus of FIG. 1.
Figure 4A:
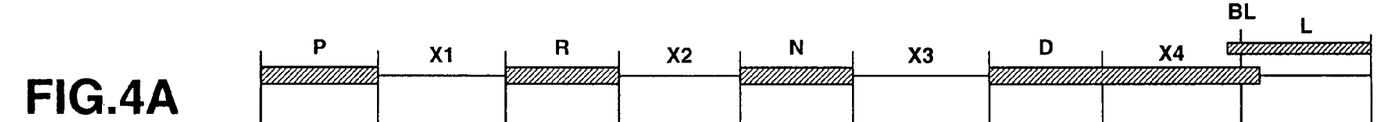
FIG. 4A through 4C are views showing how the controller performs a range recognition operation of recognizing a selected gear range with respect to the position of the select lever in the range recognition apparatus of FIG. 1.
Figure 4B:
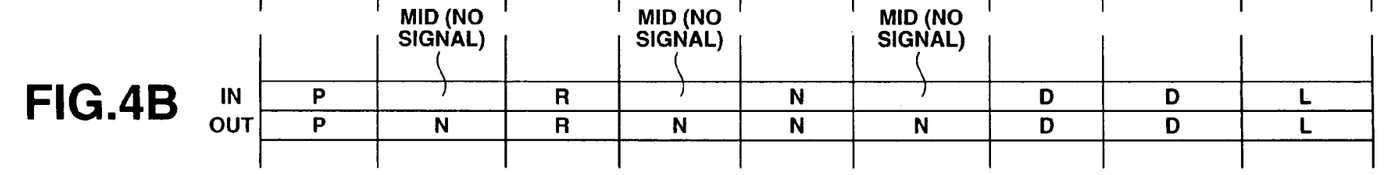
Figure 4C:
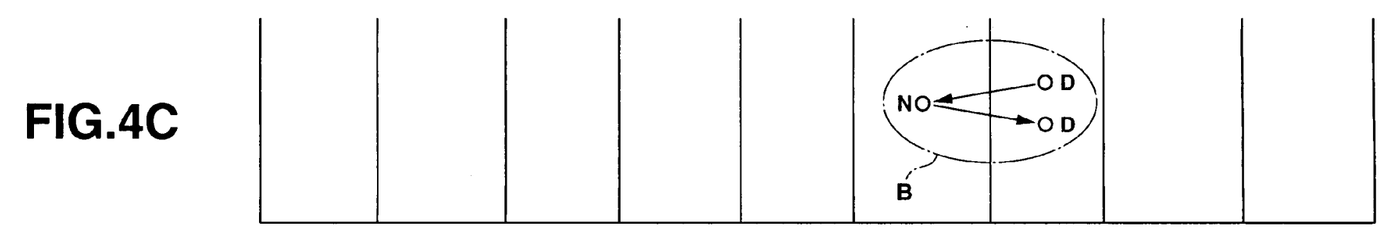

FIG. 3A is a view showing how a range signal is input from an inhibitor switch 30 into a controller 40 with respect to the position of select lever 1 in a reference range recognition device. FIG. 3B is a view showing how the range signal is input from inhibitor switch 3 into controller 4 with respect to the position of select lever 1 in the range recognition apparatus of FIG. 1. FIG. 4A through 4C are views showing how controller 4 performs a range recognition operation of recognizing a selected gear range with respect to the position of select lever 1.

As shown in FIG. 3A, in the reference embodiment, range signals P, R, N, D, and L corresponding to contacts 30a through 30e are output intermittently with respect to the position of select lever 1, so that inhibitor switch 30 is in a non-signal state where no range signal is present in intermediate positions X1 through X4 between two adjacent gear ranges.

On the other hand, as shown in FIG. 2, in inhibitor switch 3 of the present embodiment, contact 3d extends toward contact 3e, and overlaps with contact 3e along the direction of movement of select lever 1, so that D range signal D and L range signal L are simultaneously output in the overlap region, or in the boundary line BL between D-L middle range and L range. Specifically, as shown in FIG. 3B, in inhibitor switch 3, D range signal D is output in intermediate position X4 between D range and L range, i.e., almost all the regions of D-L middle range X4, but D range signal D and L range signal L are output simultaneously near range boundary line BL.

Figure 3C:
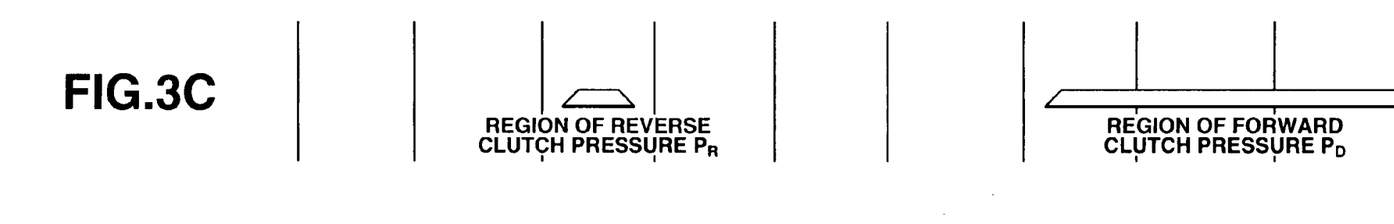
FIG. 3C is a view showing a region where a clutch pressure of the automatic transmission is regulated to an oil pressure $P_p$ required to establish reverse speeds, and a region where the clutch pressure is regulated to an oil pressure PR required to establish forward speeds.

FIG. 3C is a view showing a region where a clutch pressure of transmission mechanism 6b is regulated to an oil pressure $P_D$ required to establish reverse speeds, called a forward clutch pressure, and a region where the clutch pressure is regulated to an oil pressure PR required to establish forward speeds, called a reverse clutch pressure. As shown in FIG. 3C, in order to operate automatic transmission 6 normally, it is necessary to generate forward clutch pressure $P_D$ in D-L middle range X4. However, reference inhibitor switch 30 is in the non-signal state where the range signal is absent, in D-L middle range X4. Accordingly, in D-L middle range X4, reference controller 40 determines that there is an abnormality in inhibitor switch 30 when the non-signal state continues more than a predetermined period of time such as 5 seconds, and issues a command for performing a fail-safe control operation including release of lock-up of automatic transmission 6.

On the other hand, in inhibitor switch 3 of the present embodiment, contact 3d extends toward contact 3e, and overlaps with contact 3e along the direction of movement of select lever 1, so that D range signal D and L range signal L are simultaneously output in the overlap region, or in the boundary line BL between D-L middle range and L range. Accordingly, as shown in FIG. 4A, D range signal D is constantly output in D-L middle range X4. Accordingly, the lock-up of automatic transmission 6 is not released accidentally in D-L middle range X4. As shown in FIG. 4B, controller 4 recognizes D-L middle range X4 as a D range, without an expensive inhibitor switch for recognizing D-L middle range position X4 by using a plurality of signals output for each gear range, and thereby performs a simplified processing of recognizing a gear range. Therefore, the range recognition apparatus of the present embodiment is effective for simply and certainly preventing an undesired release of lock-up of automatic transmission 6 under a condition where select lever 1 is in D-L middle range X4. In addition, controller 4 recognizes that D range is selected when D range signal D and L range signal L are input simultaneously near range boundary layer BL. Accordingly, in the middle range X4, the gear ratio of automatic transmission 6 is suitably determined in accordance with the operating state, so that the region for stable driving condition is widely secured.

Furthermore, controller 4 recognizes D-L middle range X4 to be D range and select a suitable gear ratio according to the operating state, so that the stable driving condition is held in the middle range X4. Contact 3d extends longer than contact 3e along the direction of movement of select lever 1 and overlaps with contact 3e along the direction of movement of select lever 1 so that the region of D range signal D overlaps with the region of L range signal L. However, inhibitor switch 3 may be configured in such a manner that contact 3e extends toward contact 3d, and overlaps with contact 3d along the direction of movement of select lever 1 so that D range signal D and L range signal L are simultaneously output in the overlap region.

Figure 5:
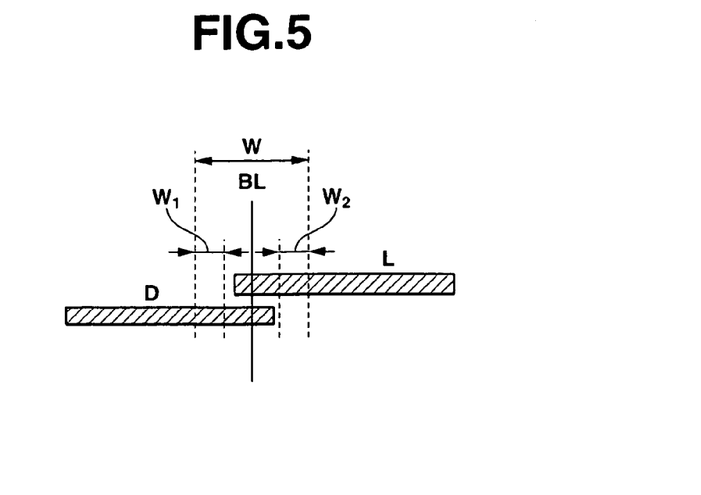
FIG. 5 is an enlarged view showing an overlap region A between of a D range signal and an L range signal in FIG. 3B.

FIG. 5 is an enlarged view showing an overlap region A between of D range signal D and L range signal L in FIG. 3B. Range boundary line BL is determined by the positions of mechanical stops of positioning select lever 1 in the range positions, called detent stop positions. Range boundary line BL changes with a variation W in detent stop position. In the present embodiment, in both ends of variation W in detent stop position are provided regions W1 and W2 that D range signal D and L range signal L do not overlap each other, respectively. This construction serves for checking disconnection in L range.

Contacts 3a, 3b, and 3c are each configured to generate a range signal during the state of select lever 1 being within a region apart from the region of D range signal D and the region of L range signal L. In the present embodiment, controller 4 is configured to determine that an abnormality or malfunction is present in inhibitor switch 3, when a multiplex input state as a first abnormal condition where in addition to D range signal D and L range signal L, at least one of range signals P, R, and N is input simultaneously in D-L middle range X4 continues over a predetermined first period of time t1 such as 0.1 second. Since a potential little turbulence in range signals resulting from disturbance etc. is eliminated by the waiting of the period t1 even if an unusual or abnormal situation of a multiplex input arises, controller 4 performs a suitable fail-safe control operation for automatic transmission 6 to the greatest extent practicable. In this embodiment, this fail-safe control operation includes an operation of reducing the engine torque and/or a selection control operation of fixing the gear ratio.

Furthermore, controller 4 is configured to determine that the abnormality of inhibitor switch 3 vanishes or is absent if the multiplex input state terminates within a predetermined second period of time t2 longer than the period t1, such as 2 seconds. This determination corrects the previous determination that an abnormality is present in inhibitor switch 3. When it is determined that the range signal becomes normal, controller 4 terminates the fail-safe control operation that is started in accordance with the previous determination of abnormality of inhibitor switch 3, avoiding an undesired release of lock-up of automatic transmission 6. Especially when a multiplex input state continues over the period t2 in middle range X4, controller 4 records the abnormality of inhibitor switch 3 in a failure history, and recognize that the D range is selected.

When no range signal is input or present in N-D middle range X3, as shown in region B in FIG. 4, controller 4 recognizes that N range is selected which disconnects the driveline in automatic transmission 6. During operation of select lever 1 from D range to N range, it is certainly once recognized that N range is selected in N-D middle range X3. Accordingly, the recognition processing of D range is stably performed in accordance with D range signal D input during the select lever operation.

In the present embodiment, controller 4 is configured to determine that an abnormality is present in inhibitor switch 3, when a non-signal state where the range signal is absent continues over a predetermined third period of time T1 such as 0.1 second. Since a potential little turbulence in range signals resulting from disturbance etc. is eliminated by the waiting of the period T1 even if a non-signal state arises, controller 4 performs a suitable fail-safe control operation for automatic transmission 6 to the greatest extent practicable. In this embodiment, this fail-safe control operation includes an operation of reducing the engine torque and/or a selection control operation of fixing the gear ratio.

Furthermore, controller 4 is configured to determine that the abnormality of inhibitor switch 3 vanishes if the non-signal input state terminates within a predetermined fourth period of time T2 longer than the period T1, such as 5 seconds. This determination corrects the previous determination that an abnormality is present in inhibitor switch 3. When it is determined that the range signal becomes normal, controller 4 finishes the fail-safe control operation that is started in accordance with the previous determination of abnormality of inhibitor switch 3, avoiding an undesired release of lock-up of automatic transmission 6. Especially when a non-signal input state continues over the period T2 in middle range X4, controller 4 records the abnormality of inhibitor switch 3 in a failure history, and recognize that the D range is selected.

In the present embodiment, controller 4 is configured to issue a shift command to automatic transmission 6 in accordance with the range recognition from inhibitor switch 3. Since controller 4 serves as a controller of the automatic transmission, the whole automatic transmission system are constructed compact.

Transmission mechanism 6b is of a gear step type in the shown embodiment. However, transmission mechanism 6b may be of any other types, such as a belt type and a toroidal infinitely variable type.

In this embodiment, contact 3d serves as a first contact configured to generate a first range signal during a state of the range selector being within a first region. Contact 3e serves as a second contact configured to generate a second range signal during the state of the range selector being within a second region overlapping with the first region. Controller 4 serves as a controller connected for signal communication to the first contact and to the second contact, and configured to perform the following: recognizing that a first gear range of the automatic transmission is selected, when the first range signal is present and the second range signal is absent; recognizing that a second gear range of the automatic transmission is selected, when the first range signal is absent and the second range signal is present; and recognizing that the first gear range is selected, when the first range signal and the second range signal are both present. The first gear range is a drive range for controlling a gear ratio of the automatic transmission in accordance with an operating condition of the automotive vehicle. The second gear range is an engine-braking range for controlling the gear ratio within a low region. The first contact extends along a direction of movement of the range selector. The second contact extends along the direction of movement of the range selector. The first contact overlaps with the second contact along the direction of movement of the range selector so that the second region overlaps with the first region. The range selector is a select lever adapted to be positioned in a first position to allow the first contact to generate the first range signal, and in a second position to allow the second contact to generate the second range signal. The first contact is configured to generate the first range signal during the range selector being between the first position and the second position.

This application is based on a prior Japanese Patent Application No. 2004-295000 filed on Oct. 7, 2004. The entire contents of this Japanese Patent Application No. 2004-295000 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A range recognition apparatus for an automatic transmission, comprising:
   a range selector;
   a first contact configured to generate a first range signal during a state of the range selector being within a first region;
   a second contact configured to generate a second range signal during the state of the range selector being within a second region overlapping with the first region;
   a third contact configured to generate a third range signal during the state of the range selector being within a third region apart from the first region and the second region; and
   a controller connected for signal communication to the first contact and to the second contact, and configured to perform the following:
   recognizing that a first forward drive range of the automatic transmission is selected, when the first range signal is present and the second range signal is absent;
   recognizing that a second forward drive range of the automatic transmission is selected, when the first range signal is absent and the second range signal is present; and
   recognizing that the first forward drive range is selected, when the first range signal and the second range signal are both present; and
   determining that an abnormality is present, in case a first abnormal condition where the first range signal, the second range signal, and the third range signal are simultaneously present continues over a predetermined first period of time.

2. The range recognition apparatus as claimed in claim 1, for an automotive vehicle, wherein the first forward drive range is a drive range for controlling a gear ratio of the automatic transmission in accordance with an operating condition of the automotive vehicle, and wherein the second forward drive range is an engine-braking range for controlling the gear ratio within a low region.

3. The range recognition apparatus as claimed in claim 1, wherein the first contact extends along a direction of movement of the range selector, wherein the second contact extends along the direction of movement of the range selector, and wherein the first contact overlaps with the second contact along the direction of movement of the range selector so that the second region overlaps with the first region.

4. The range recognition apparatus as claimed in claim 1, wherein the first contact extends longer than the second contact along a direction of movement of the range selector and overlaps with the second contact along the direction of movement of the range selector so that the second region overlaps with the first region.

5. A range recognition apparatus for an automatic transmission, comprising:
   a range selector;
   a first contact configured to generate a first range signal during a state of the range selector being within a first region;
   a second contact configured to generate a second range signal during the state of the range selector being within a second region overlapping with the first region;
   a third contact configured to generate a third range signal during the state of the range selector being within a third region apart from the first region and the second region; and
   a controller connected for signal communication to the first contact and to the second contact, and configured to perform the following:
   recognizing that a first gear range of the automatic transmission is selected, when the first range signal is present and the second range signal is absent;
   recognizing that a second gear range of the automatic transmission is selected, when the first range signal is absent and the second range signal is present;
   recognizing that the first gear range is selected, when the first range signal and the second range signal are both present; and
   determining that an abnormality is present, in case a first abnormal condition where the first range signal, the second range signal, and the third range signal are simultaneously present continues over a predetermined first period of time.

6. The range recognition apparatus as claimed in claim 5, wherein the controller is configured to determine that the abnormality is absent, in case the first abnormal condition terminates within a predetermined second period of time longer than the first period.

7. The range recognition apparatus as claimed in claim 1, wherein the controller is configured to recognize that a neutral range for disconnecting a driveline of the automatic transmission is selected, when no range signal is present.

8. A range recognition apparatus for an automatic transmission, comprising:
   a range selector;
   a first contact configured to generate a first range signal during a state of the range selector being within a first region;
   a second contact configured to generate a second range signal during the state of the range selector being within a second region overlapping with the first region; and
   a controller connected for signal communication to the first contact and to the second contact, and configured to perform the following:
   recognizing that a first gear range of the automatic transmission is selected, when the first range signal is present and the second range signal is absent;
   recognizing that a second gear range of the automatic transmission is selected, when the first range signal is absent and the second range signal is present;
   recognizing that the first gear range is selected, when the first range signal and the second range signal are both present; and
   determining that an abnormality is present, in case a second abnormal condition where no range signal is present continues over a predetermined third period of time.

9. The range recognition apparatus as claimed in claim 8, wherein the controller is configured to determine that the abnormality is absent, in case the second abnormal condition terminates within a predetermined fourth period of time longer than the third period.

10. The range recognition apparatus as claimed in claim 1, wherein the controller is configured to control a shift operation of the automatic transmission in accordance with the recognized range selection.

11. The range recognition apparatus as claimed in claim 1, wherein the range selector is a select lever adapted to be positioned in a first position to allow the first contact to generate the first range signal, and in a second position to allow the second contact to generate the second range signal, and wherein the first contact is configured to generate the first range signal during the range selector being between the first position and the second position.

12. The range recognition apparatus as claimed in claim 1, wherein the automatic transmission includes a lock-up torque converter, wherein the first forward drive range includes an operation of locking up the lock-up torque converter, and wherein the second forward drive range includes an operation of locking up the lock-up torque converter.

13. The range recognition apparatus as claimed in claim 1, wherein the controller is configured to determine that the abnormality is absent, in case the first abnormal condition terminates within a predetermined second period of time longer than the first period.

14. A range recognition apparatus for an automatic transmission, comprising:
   a range selector;
   a first contact configured to generate a first range signal during a state of the range selector being within a first region;
   a second contact configured to generate a second range signal during the state of the range selector being within a second region overlapping with the first region; and
   a controller connected for signal communication to the first contact and to the second contact and configured to perform the following:
   recognizing that a first forward drive range of the automatic transmission is selected when the first range signal is present and the second range signal is absent;
   recognizing that a second forward drive range of the automatic transmission is selected, when the first range signal is absent and the second range signal is present;
   recognizing that the first forward drive range is selected, when the first range signal and the second range signal are both present; and
   determining that an abnormality is present, in case a second abnormal condition where no range signal is present continues over a predetermined third period of time.

15. The range recognition apparatus as claimed in claim 14, wherein the controller is configured to determine that the abnormality is absent, in case the second abnormal condition terminates within a predetermined fourth period of time longer than the third period.

\* \* \* \* \*